Patented July 19, 1927.

1,636,106

UNITED STATES PATENT OFFICE.

ERNEST EUGENE NAEF, OF PARIS, FRANCE, ASSIGNOR TO TUBIZE ARTIFICIAL SILK COMPANY OF AMERICA, A CORPORATION OF DELAWARE.

METHOD OF PRODUCING ALKALI-METAL SULPHYDRATES.

No Drawing. Application filed January 26, 1924, Serial No. 688,842, and in Great Britain January 31, 1923.

The invention relates to the improvements in the production of alkali-metal sulphydrates.

Compounds of sulphur with alkali metal or alkaline earth metal, such for example as hydrosulphides are generally produced by saturating alkali metal or alkaline earth hydroxides or sulphides with hydrogen sulphide in aqueous solution. Thiosulphates, for instance, are produced by boiling the solution of an alkali metal or alkali earth metal sulphite with sulphur or by oxidizing alkali metal or alkali earth metal sulphides, or finally by the action of sulphur dioxide on sulphides. Alkali metal or alkali earth metal sulphides are produced by reducing the sulphates with carbon at high temperatures. Generally these processes are very cumbersome and more or less expensive and moreover the use of sulphur with dioxide and sulphuretted hydrogen on an industrial scale is unpleasant. The present invention aims at overcoming these drawbacks and provides a simple process for the production of compounds of sulphur and alkali metal or alkaline earth metals, which enables to produce hydrosulphides, thiosulphates, sulphides, or mixtures thereof, at will in one operation.

I have found that if a mixture of alkali metal sulphate, and preferably heavy hydrocarbon oils (of the kind specified below) is heated with or without finely divided sulphur to dull red heat in a closed vessel, in absence of air, but provided with an outlet for the escaping reduction gases, alkali metal hydrosulphide is mainly produced. The proportion of sulphur and hydrocarbon oils used, may vary within wide limits. In the course of the reduction of the alkali metal sulphates, complex chemical reaction takes place and as intermediate stage in the formation of alkali metal hydrosulphides, alkali metal sulphites and alkali metal thiosulphates are formed. The formation of these compounds occurs already at low dull red heat and if desired the reaction can be stopped at that stage by cooling the mass down, and the alkali metal thiosulphate which is mainly formed eliminated by lixiviation together with fractional crystallization of the aqueous extract thus obtained in the well known manner. This intermediate reaction also occurs at little higher temperature than at dull red heat, but the alkali metal thiosulphate and small quantities of alkali metal sulphite formed, are quickly converted into alkali metal hydrosulphides. The formation of alkali metal polysulphides and alkali metal sulphides has also been noticed during the reduction process in a small degree, but these are also converted finally into alkali metal hydrosulphide.

The heavy hydrocarbon oils act as powerful reducing agents and accomplish the reduction of the alkali metal sulphates at lower temperatures than those hitherto practiced by known methods. The heavy hydrocarbon oils and sulphur act on the alkali metal sulphates at the above named heats and produce complex chemical reactions and as a final reaction product alkali metal hydrosulphides are produced in the main and small quantities of alkali carbonates. The hydrocarbon oils, paraffin oils, petroleum and others, undergo decomposition and cracking; and lighter hydrocarbons formed can be distilled off. The formation of some sulphuretted hydrogen is also observed and this can be drawn off and is suitably absorbed.

The same reaction can be applied to alkali metal bisulphates or to nitrecake; these products yield when reduced with heavy hydrocarbon oils and sulphur at dull red heat, alkali metal hydrosulphides.

Alkali metal sulphites, likewise behave similarly as alkali metal sulphates and yield under the above conditions also alkali metal hydrosulphides. The sulphur used in the above examples may be partially or completely replaced by finely divided ground iron pyrites, or other sulphides of heavy metals, such as copper and lead. In case of reduction of alkali metal sulphates or alkali metal sulphites, it can be replaced also by alkali metal polysulphides. These yield sulphur and themselves are converted into alkali metal hydrosulphides during the reduction.

Alkali metal thiosulphates can be reduced directly with heavy hydrocarbon oils under the above heat conditions, or sulphur may be added or iron pyrites with formation of alkali metal hydrosulphides.

The reduction of alkali metal sulphates or sulphites or alkali metal bisulphates or nitrecake can also be carried out with heavy hydrocarbon oils, without the addition of sulphur or materials producing such; the final reduction products containing, however, larger proportions of alkali carbonate besides the alkali metal hydrosulphide, than otherwise would be the case.

When insufficient hydrocarbons are present during the reduction of the alkali metal sulphates, sulphites or alkali metal thiosulphates, alkali metal sulphides are formed, in preference to alkali metal hydrosulphides.

Alkaline earth metal sulphates, such as calcium or barium sulphates are reduced by heavy hydrocarbon oils at dull red heat with great ease, and almost white alkaline earth metal sulphides are being formed. By the ordinary methods of reduction of these sulphates with carbon or carbon bearing materials, much higher temperatures are required and 900-1200° C. are generally maintained; and the products of reduction obtained are of far less purity than is the case above. This reduction of the sulphates of the alkaline earth metals, can be carried out with heavy hydrocarbon oils with or without the addition of sulphur. The formation of alkaline earth metal thiosulphates only occurs in a small degree and a few percent only were observed to be intermediately formed. The formation of alkaline earth metal hydrosulphide likewise only occurs in a minor degree and chiefly alkaline earth metal sulphides are being produced. In any and all of the stated examples, the reduction can be carried out at dull red heat at ordinary or increased pressure and in absence or presence of catalytical substances such as iron or copper or nickel or their sulphides.

The sulphur and heavy hydrocarbon oils or both may be added gradually during the heating of the alkali metal sulphates or sulphites or thiosulphates under reduction, either as such or in form of sprays or vapours or the sulphur may be suspended or dissolved in the hydrocarbon oils previous to addition. The reduction may be carried out in vessels of iron, nickel or nickel steel and other metals or alloys resisting temperature and chemical action or in graphite or alkali resisting crucibles.

As hydrocarbons may be used, light and heavy tar oils from ordinary gas works, coke ovens, producer gas plants, neutral wood tar, shale oil, heavy hydrocarbons such as natural occurring oils, higher boiling paraffin oils, crude paraffin oils, petroleum oils, crude petroleum oil containing more or less sulphur, residues of distillation of heavy hydrocarbon oils, or other sources of hydrocarbon oils in general. These oils must not be too volatile, their boiling point being approximately 200-300° C. or over, they contain a great range of hydrocarbon compounds and other organic substances. These hydrocarbons of various origins may be used alone or mixed together, furthermore, other hydrogenated organic hydrocarbons may be added to them. The heavy hydrocarbon oils undergo at the heats stated a decomposition and cracking. They enter reaction with the sulphur and the alkali sulphur compounds, subjected to reduction, and form finally alkali metal hydrosulphides. The formation of the sulphuretted hydrogen is observed which can be carried away by the reduction gases formed and is suitably absorbed by caustic soda or slacked lime liquors. The reduction of alkali metal sulphates or sulphites or bisulphates or thiosulphates or nitrecake or alkaline earth metal sulphates, can also be carried out with heavy hydrocarbons and sulphur in the presence of reducing gases such as hydrogen or water gas or producer gas, provided these do not contain any marked quantities of carbondioxide gas; the operation can be effected at ordinary or increased pressure or in the presence of catalytical agents such as iron, copper or nickel or their sulphides. Other lighter hydrocarbons in general and sulphur also effect the reduction of alkali metal sulphates or sulphites of bisulphates or thiosulphates or alkali earth metal sulphates, with similar results as stated, on account of their volatilizing, their use is, however, less advantageous.

Having now described the general idea of the invention, the following example will illustrate in what manner the said invention is carried out.

*Example 1.*

*Production of alkali metal hydrosulphide.*—An intimate mixture of one part of alkali metal sulphate, with 0.25 part of finely divided sulphur and 0.5 part of heavy neutral tar oil from gas works, or heavy crude petroleum oil, is heated to dull red heat in a closed iron vessel in absence of air. The apparatus is provided with a stirring gear and with an outlet for the escape of gases formed during the reaction and heated externally by any source of heat. An evolution of hydrocarbon vapours, carbon monoxide and some sulphuretted hydrogen takes place and the reduction of the alkali metal sulphate takes place readily. The gases and vapours of hydrocarbons are carried away by an exhaust pipe, are condensed and can be used again, whereas hydrogen sulphide is absorbed by well known means.

After heating the mass while stirring for 30–40 minutes, the evolution of the hydrocarbon vapours and gases slows down and the reduction is complete. The progress of the reaction can be ascertained by taking small samples with a dipper and testing them by titration. During the operation the mass must always be kept in a reducing atmosphere, this being generally produced by the vapours and gases given off through heating from the tar oils or heavy petroleum oils. When the reduction is completed the mass represents a semi-molten mass to molten mass, which may be cooled down in a reducing or inert atmosphere, or poured into a vessel to which access of air is prevented. The reaction mass, when cooled down represents a very porous mass, which is very hygroscopic and undergoes slow decomposition, when exposed to air, sulphuretted hydrogen being evolved. It represents the crude alkali metal sulphydrate formed.

In the above example, the whole of the quantities of tar oil or heavy petroleum oil, need not be mixed from the outset with the alkali metal sulphate; one may add only half or two thirds of them and add the remainder through a suitable opening in the reaction vessel, during the further heating of the mass. The quantities of sulphur and tar oils or heavy petroleum oils may be further increased than indicated, which somewhat favors the formation of alkali metal hydrosulphide.

The crude reaction mass obtained, contains besides alkali metal hydrosulphide, small quantities of alkali metal carbonate, alkali metal thiosulphate, traces of alkali metal sulphate and sulphite, occasionally alkali metal polysulphides and insoluble matter, chiefly carbon. The mass is readily soluble in water, the solution has a strong alkaline reaction. By adding a small quantity of cold water only, the alkali metal sulphydrate is brought into solution first, leaving the greater part of the other compounds undissolved. The solution can be decanted and concentrated if desired by evaporation in vacuum. An alternative way consists in heating the aqueous extract with a small quantity of slacked lime or calcium chloride solution, thus eliminating these mentioned impurities, and concentrating the clear solution by evaporation in vacuum.

In the above described example one can also admit hydrogen or water gas, or producer gases free from carbondioxide gas, during the reduction, which assist the reduction of alkali metal sulphates. The addition of small quantities of catalytical agents such as finely divided iron or nickel, or copper or their sulphides can also be effected, without changing the result of the reaction. The reduction can also be carried out at increased pressure.

Example 2.

*a. Production of alkali metal thiosulphate.*—The mixture of alkali metal sulphate and sulphur and heavy tar oils, or heavy petroleum oils, is heated in a closed vessel as described above to slightly lower temperatures, i. e., begin at dull red heat. Almost the totality of the alkali sulphate is transformed into alkali metal thiosulphate, containing varying proportions of alkali metal hydrosulphide, traces of alkali metal sulphide and alkali carbonate. Thus by preventing the temperature from rising too high, the reduction can be stopped before any substantial amount of the last named products are being formed. The mass is thereupon cooled and the alkali metal thiosulphate is dissolved out with water and after concentration crystallized out.

*b. Production of alkali metal hydrosulphide from alkali metal thiosulphates.*—If the reduction is carried further in Example 2ª, by heating the mass longer or to higher temperatures and by adding further quantities of heavy hydrocarbons, the alkali metal thiosulphate formed is transformed into alkali metal hydrosulphide. The same result can be obtained by subjecting dry alkali metal thiosulphate directly to the reduction of heavy tar or petroleum oils at dull red heat. If the reduction is carried out with the addition of sulphur, alkali metal hydrosulphide is also produced and sulphuretted hydrogen is evolved.

Example 3.

*Production of alkali metal hydrosulphides from alkali metal sulphites.*—Alkali metal sulphites can likewise be reduced by heavy tar oils or heavy petroleum oils and sulphur, with formation of alkali hydrosulphides. The same conditions are maintained as in Example 1 and the alkali metal sulphites behave in the same manner as their sulphates during the reduction.

Example 4.

*a. Production of alkali metal sulphides.*—When the proportion of heavy hydrocarbons, or heavy petroleum oil in the above three examples, is insufficient for the production of alkali metal hydrosulphides, alkali metal sulphides are produced in preference. Thus, for instance, when the proportion of hydrocarbons entering reaction is only 0.05–0.10 part to every part of alkali metal sulphate, or sulphite or thiosulphate, the formation of alkali metal sulphides occurs at dull red heat and in presence as stated of sulphur.

*b. Production of alkaline earth metal sulphides.*—The reduction of alkaline earth metal sulphates, such as calcium or barium sulphate, to their respective sulphides, with heavy hydrocarbons or heavy petroleum oils at dull red heat to red heat, proceeds also very smoothly. Hitherto the reduction of these sulphates was effected with coal and required somewhat high temperatures, ranging from 900–1200° C. With hydrocarbon oils these temperatures are greatly decreased, this calcium sulphate yields when heated with heavy tar oils or heavy petroleum oils white calcium sulphide at temperatures approximating 600–700° C.; although higher temperatures may be used and furthermore the reduction proceeds much more rapidly and completely. Barium sulphate can be reduced in a similar way and it reduces easily and quantitatively to an almost white barium sulphide; the ordinary process when reduction takes place with carbon, yields a dark colored product and in lower yields. Example: 25 parts of finely ground barium sulphate are mixed intimately with 5-10 parts of heavy paraffin oil and heated in a closed vessel, while being stirred, to dull red heat. The heating is continued for 25-30 minutes, an evolution of hydrocarbon vapours takes place together with carbon monoxide and some sulphuretted hydrogen. The reduction of the sulphate proceeds rapidly and is generally finished in the time stated and when the evolution of gases is finished. The reaction mass is cooled in a reducing atmosphere of hydrocarbon vapours and represents an almost white powder, consisting of almost pure barium sulphide. It can be recrystallized from hot water in the well known manner. If the reduction of the alkali earth metal sulphates is carried with heavy hydrocarbons and with the addition of sulphur, the result is the same, the formation of sulphides, the sulphur being volatilized as such and as sulphuretted hydrogen during the reduction.

*Example 5.*

*Production of alkali metal hydrosulphides from alkali metal sulphates or alkali metal sulphites, without the addition of sulphur.—* The products of reduction can also be influenced by not using sulphur in the reduction of alkali metal sulphates or sulphites with hydrocarbons. When these latter named compounds are heated with hydrocarbons or heavy hydrocarbon oils and without sulphur or metallic sulphides, to dull red heat in a constantly reducing atmosphere, as described in Example 1, the reaction product contains besides alkali metal hydrosulphide, alkali carbonate and this in a larger proportion than if sulphur were used. The complex chemical reaction taking place also seems to differ inasmuch as only small quantities of alkali metal thiosulphate are produced as intermediate products or none at all and hydrogen sulphide is not formed.

*Example 6.*

*Production of alkali metal hydrosulphides from alkali metal bisulphates or nitrecake.—* When alkali metal bisulphates or a product containing same, such as nitrecake are reduced with heavy tar oils, or heavy paraffin oils, or crude petroleum oils, directly or with the addition of sulphur at dull red heat, alkali metal hydrosulphides are obtained. The following example will show how the reaction is carried out.

100 parts of nitrecake, as obtained normally in the manufacture of nitric acid, and containing varying amounts of alkali bisulphate, are mixed with 20 parts of finely divided sulphur and 45 parts of heavy petroleum oil. The mass is heated to dull red heat in a closed iron vessel, provided with stirring gear and with an outlet for the escape of the gaseous products from the reduction mass. The hydrocarbon soon undergoes a process of cracking and decomposition, the mass begins to foam and assumes quite a liquid state. An evolution of hydrocarbon vapours take place and of carbon monoxide and of sulphuretted hydrogen, the latter of which can be suitably absorbed. When the foaming has subsided, the mass assumes a clear liquid state. At this stage, while stirring well, a further quantity of 5 parts of sulphur is admitted to the melt gradually. The reduction is generally completed after heating the mass for 35-45 minutes and this can be ascertained by taking a sample and testing it in the well known way for sulphates. The mass is then cooled down in a reducing atmosphere of hydrocarbon vapors or an inert gas. It represents a porous grey mass easily soluble in water, with the exception of insoluble matters, consisting chiefly of carbon. The crude alkali metal hydrosulphide thus obtained can be purified if desired, as described under Example 1. The sulphur in this example can be replaced by iron pyrites in a finely divided state. The reduction can also be carried out at increased pressure, or in presence of catalytical agents such as finely divided iron, or copper or nickel.

*Example 7.*

*Production of alkali metal hydrosulphides from alkali metal polysulphides.—*Alkali metal disulphides, or polysulphides, are, when heated with heavy neutral tar oils, or heavy paraffin oils, crude or refined, to dull red heat, converted into alkali sulphydrates. This conversion to sulphydrates also takes place when alkali sulphide is heated with sulphur and heavy hydrocarbons. These operations may also be carried out in presence of hydrogen or gases containing such. Alkaline earth metal sulphide such as calcium sulphide and polysulphides heated with sulphur and heavy hydrocarbons to low dull red heat yield calcium sulphydrate (in small proportion).

The results obtained in the above described reaction are entirely unforseen, inasmuch as all the methods of reduction of alkali metal sulphates with organic compounds (chiefly carbon) hitherto known, describe the production of alkali metal sulphide only.

It is evident that numerous modifications and alterations may be made, thus the whole range of saturated and unsaturated hydrocarbons and sulphur can be used in the described processes without altering the spirit of the invention.

I have established that alkali metal hydrosulphides, alkali metal thiosulphates, alkali metal sulphides or mixtures thereof, or alkaline earth metal sulphides, can be produced at will in one simple operation and that the hydrocarbons not only act as powerful reducing agents, but when producing alkali metal hydrosulphides, they supply the hydrogen required for the formation of these compounds by way of complex chemical reactions.

Having now described my invention, what I claim as new and desire to secure by Letters Patent, is:

1. The method of producing alkali metal sulphydrates which consists in heating an alkali metal sulphoxy compound with hydrocarbon oils and sulphur in quantity sufficient to effect the reduction.

2. The method of producing sodium sulphydrates which consists in heating sodium bisulphate with hydrocarbon oil and sulphur in quantity sufficient to effect the reduction.

3. The production of alkali metal sulphydrates by reducing alkali metal sulphoxy compounds with heavy hydrocarbons in presence of sulphur at dull red heat and under exclusion of air.

ERNEST EUGENE NAEF.